(12) United States Patent
Bhandari

(10) Patent No.: US 8,543,113 B2
(45) Date of Patent: Sep. 24, 2013

(54) METHOD AND SYSTEM FOR CONTROLLING CELL RESELECTIONS ON A COMPUTING DEVICE

(75) Inventor: Puneet Bhandari, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 135 days.

(21) Appl. No.: 12/885,499

(22) Filed: Sep. 18, 2010

(65) Prior Publication Data
US 2012/0071167 A1      Mar. 22, 2012

(51) Int. Cl.
*H04W 36/00* (2009.01)

(52) U.S. Cl.
USPC ........ 455/436; 455/422.1; 455/440; 455/444; 455/525; 455/442

(58) Field of Classification Search
USPC .............. 455/436, 422.1, 440, 444, 525, 442
See application file for complete search history.

(56) References Cited

U.S. PATENT DOCUMENTS

| | | | |
|---|---|---|---|
| 2006/0258386 A1* | 11/2006 | Jeong et al. | 455/525 |
| 2010/0240356 A1* | 9/2010 | Lee et al. | 455/422.1 |
| 2010/0317349 A1* | 12/2010 | Serravalle | 455/440 |
| 2011/0021201 A1* | 1/2011 | Lee et al. | 455/444 |

\* cited by examiner

*Primary Examiner* — Meless N Zewdu
*Assistant Examiner* — Jean Chang

(57) ABSTRACT

A method and a system for controlling cell reselection on a computing device are disclosed. The method comprises detecting the mobile device operating under a potential over-shuttling reselection condition, and making a determination as to whether the mobile computing device operation is operating under the over-shuttling reselection condition based on pre-determined criteria.

20 Claims, 7 Drawing Sheets t=t1  Device Connects Cell 1 t>t3  Device Connects Cell 3 (No Shuttle)

| Time | Serving cell | Target cell |
|---|---|---|
| t1 | Cell 1 | Cell 2 |
| t2 | Cell 2 | Cell 3 |
| t3 | Cell 3 | Cell 2 |
| t4 | Cell 2 | Cell 3 |
| ... | ... | ... |

FIG. 3E

METHOD AND SYSTEM FOR CONTROLLING CELL RESELECTIONS ON A COMPUTING DEVICE

TECHNICAL FIELD

The disclosed embodiments relate to cellular computing devices, and more specifically, to a method and system for controlling cell reselection on a cellular device.

BACKGROUND

Computing devices, particularly mobile computing devices and other small form-factor computing devices, are configured to connect to telecommunication systems, such as the Uniform Mobile Telecommunications System (UMTS), by connecting to a nearby cell tower. A cell tower enables multiple mobile computing devices to connect to the network as long as the mobile computing devices are within range of the cell tower, i.e. within the cell region. Due to the increased use of mobile computing devices, mobile networks have expanded their service by building more cell towers in more areas. As a result, there are certain regions which have multiple overlapping UMTS cells so that a mobile computing device that is found in this region may be able to connect with any of the available cells. A mobile computing device that is located in this region, therefore, may switch from cell to cell depending on cell conditions.

BRIEF DESCRIPTION OF THE DRAWINGS

FIG. 3E is an example of a table with records of cell reselections made by a computing device, under an embodiment.

DETAILED DESCRIPTION

Figure 1A:
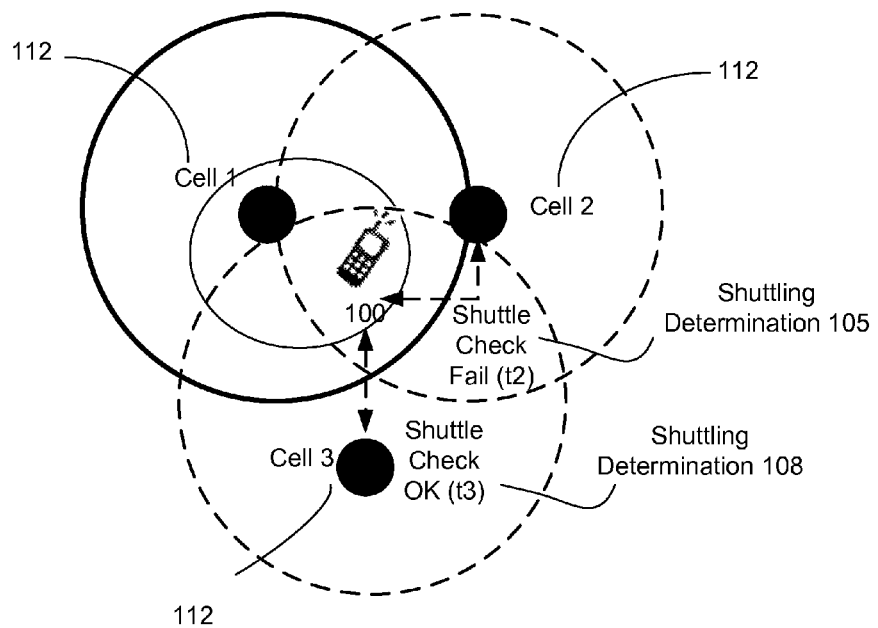
FIG. 1 illustrates an example of a computing device operating in accordance with one or more embodiments.

Numerous embodiments described herein provide for a method and a system for controlling cell reselections on a computing device. In an embodiment, a computing device controls its cellular reselection behavior under certain conditions. In particular, a computing device is configured to detect when it operates under a potential over-shuttling reselection condition (alternatively referred to as "ping-pong" reselection). The computing device then makes a determination as to whether the over-shuttling reselection condition is present based on pre-determined criteria. If the over-shuttling reselection behavior is present (i.e., the device ping-pongs between cells), the device can terminate the behavior. Among other benefits, the device is precluded from wasting power as a result of futile shuttling between cells.

As discussed above, certain areas have multiple overlapping UMTS cells so that a computing device can be located in multiple cells at the same time. A computing device that is located in an overlapping region may be able to connect with any of the available cells depending on certain conditions being present. However, areas of multiple overlapping UMTS cells may have radio frequency (RF) conditions that are poor or unstable. This could be a result of insufficient power or low signal quality of the cells. A computing device is configured to seek connection with a cell that is of higher quality, particularly when the serving cell is of low quality. When multiple overlapping cells are of low quality or are unstable, embodiments recognize that the computing device can switch back and forth between the low quality cells. This type of repeated reselection is termed an over-shuttling reselection or ping-pong effect. Embodiments recognize that a computing device can continuously perform over-shuttling reselections between low quality on a continuous and repeated basis, causing a significant consumption of power. This behavior can occur even though the computing device is nearly stationary with respect to the cells, and no truly better cell is available.

Embodiments such as described can avoid frequent shuttle reselections, particularly in areas with multiple overlapping cells that have poor or unstable RF conditions. By classifying whether a computing device operation is under an over-shuttling reselection condition, embodiments preclude or avoid the shuttle reselections, and thus avoid unnecessary power consumption.

As an addition or variation, embodiments include use of a cell reselection table for purpose of maintaining records of reselections made by the computing device.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or may alternatively be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

A mobile computing device may correspond to any device that includes roaming wireless networks and/or telephony capabilities, including cellular telephony devices, mobile messengers, and portable computers that use internal or external cellular modems. In particular, embodiments described herein may apply to numerous kinds of mobile or small form-factor computing devices. One type of mobile computing device that may be configured to include embodiments described herein includes a computer telephony device, such as a cellular phone or mobile device with voice-telephony applications (sometimes called "smart phone"). A computing device such as described may be small enough to fit in one hand, while providing cellular telephony features in combination with other applications, such as messaging, web browsing, media playback, personal information management (e.g. such as contact records management, calendar applications, tasks lists), image or video/media capture and other functionality. Mobile computing devices in particular may have numerous types of input mechanisms and user-interface features, such as keyboards or keypads, multi-directional or navigation buttons, application or action buttons, and contact or touch-sensitive display screens. Some devices may include combinations of keyboard, button panel area, and display screen on one façade. The button panel region may occupy a band between the keypad and the display area, and include a navigation button and multiple application buttons or action buttons. Other types of computing devices contemplated with embodiments described herein include laptop or notebook computers, ultra-mobile computers, personal digital assistants, and other mufti-functional computing devices.

According to an embodiment, a mobile computing device may include one or more processors, memory resources, one or more wireless communication ports, and various other input/output features, including a display assembly, a speaker, a microphone and other input/output mechanisms. According to one or more embodiments, the display assembly includes a touch-sensitive display interface to receive human contact (or close proximity) as input. More specifically, the display assembly provides an interface by which the user may enter directional input for scrolling actions. These directional inputs may be entered by, for example, the user swiping or moving a finger in a particular direction that coincides (or is interpreted to coincide) with a particular linear direction. As described with embodiments above, the processor(s) may process the inputs to present application content in defined regions, simulate scrolling, and display over-scroll content when the user has over-scrolled.

Embodiments described herein include individual elements and concepts described herein, independently of other concepts, ideas or systems, as well as combinations of elements recited anywhere in this application. Although illustrative embodiments of the invention have been described in detail with reference to the accompanying drawings, it is to be understood that the described embodiments are not limited to those precise embodiments, but rather include modifications and variations as provided. Furthermore, a particular feature described either individually or as part of an embodiment can be combined with other individually described features, or parts of other embodiments, even if the other features and embodiments make no mention of the particular feature.

Figure 1B:
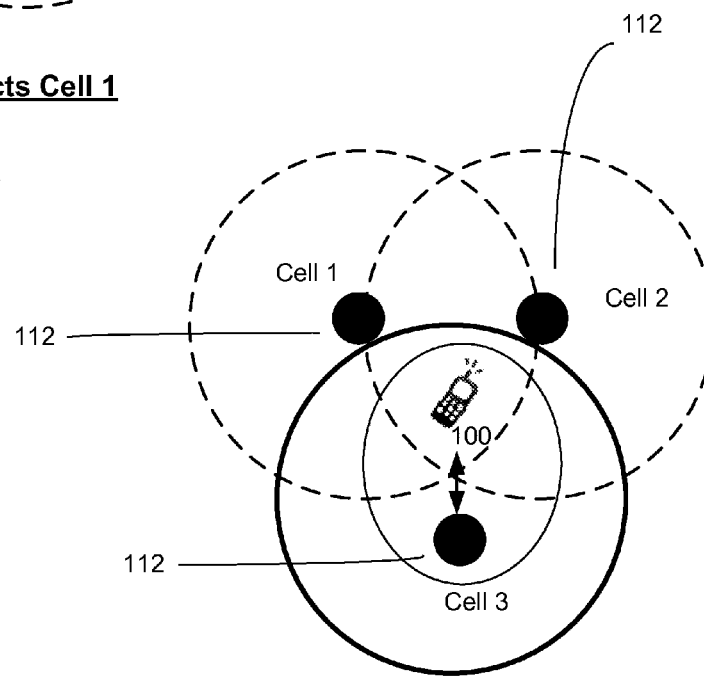

FIG. 1A and FIG. 1B illustrate an example of a computing device operating in accordance with one or more embodiments. A computing device 100 may correspond to any device that operates on a cellular environment. Specific examples include, (i) a mobile computing device, such as a device capable of cellular telephony and/or data transmissions; (ii) a laptop or tablet that is equipped with a cellular modem; or (iii) a cellular modem that integrates with another computing device. In describing numerous embodiments throughout this application, specific reference is sometimes made to a mobile computing device. Such reference is intended to provide an example of a suitable device for use with embodiments described, and other devices that can operate with cellular networks may readily be substituted for mobile computing devices.

In FIG. 1A, device 100 is configured to (i) detect presence of weak (or poor quality) overlapping cell regions 112 that can potentially trigger an over-shuttling reselection condition (i.e., ping-ponging between weak cells 112); and (ii) switch amongst cells while checking to avoid shuttling or ping-pong reselection behavior. As used herein, the term "serving cell" means a cell region that a computing device is currently using or is currently connected to. Similarly, the term "target cell" means a cell region that a computing device is considering to switch into. A "neighboring cell" is a cell region that overlaps with another cell region. With reference to FIG. 1A, the serving cell is Cell 1, and the neighboring cells are Cell 2 and Cell 3. Although the cells are illustrated by circles in FIGS. 1A-1B and 3A-3D, cell regions may be in various shapes and sizes. In FIG. 1A, the computing device 100 is located in a region where three cells (Cell 1, Cell 2, and Cell 3) are overlapping.

Furthermore, in the scenario presented by FIG. 1A, at time (t(2)), the target cell is Cell 2. The computing device 100 recognizes that Cell 1 and cell 2 have relative characteristics which would warrant the device into switching to Cell 2, if such a determination was made purely on the basis of the cell reselection criterion without considering an embodiment described herein. Thus, at time (t(2)), Cell 2 becomes the target cell. According to an embodiment, the device 100 would reselect to Cell 2, provided that the device 100 does not recognize itself as being under an over-shuttling reselection condition or behavior with respect to Cell 2. As described with other embodiments, the device 100 makes a determination 105 at time (t(2)) as to whether it is under an over-shuttling reselection condition or behavior. In the scenario presented, the target device recognizes the over-shuttling behavior prior to its switching to Cell 2, and thus avoids making the switch. Furthermore under one embodiment, the switch is avoided only for a predetermined period of time. If the relative characteristics of Cell 1 and Cell 2 (which triggered the potential reselection) remain the same beyond this period of time, the embodiment allows the switch to occur. In this way, embodiment limits its function to conditions that are unstable and does not prevent reselection to a cell that is consistently better than the serving cell.

According to an embodiment depicted by FIG. 1A, the device 100 at time (t(3)) makes a subsequent determination 108 as to whether switching from Cell 1 to Cell 3 is warranted and not shuttling. In the example provided, conditions indicating potential shuttling behavior may have changed. The shuttling determination 108 may then present a result that cellular reselection is warranted. FIG. 1B illustrates that at time (t(3)), the mobile computing device 100 switches from the serving cell (Cell 1), to the target cell (Cell 3). The computing device 100 performs this reselection based on the determination 108 being made that the target cell (Cell 3) provides better service as compared to Cell 1. A neighboring cell may provide better service, for example, if it has a higher power level or a better signal quality than a serving cell. Thus, in the example of FIG. 1A and FIG. 1B, after the reselection by the computing device 100, the new serving cell for the computing device 100 is Cell 3.

Figure 2:
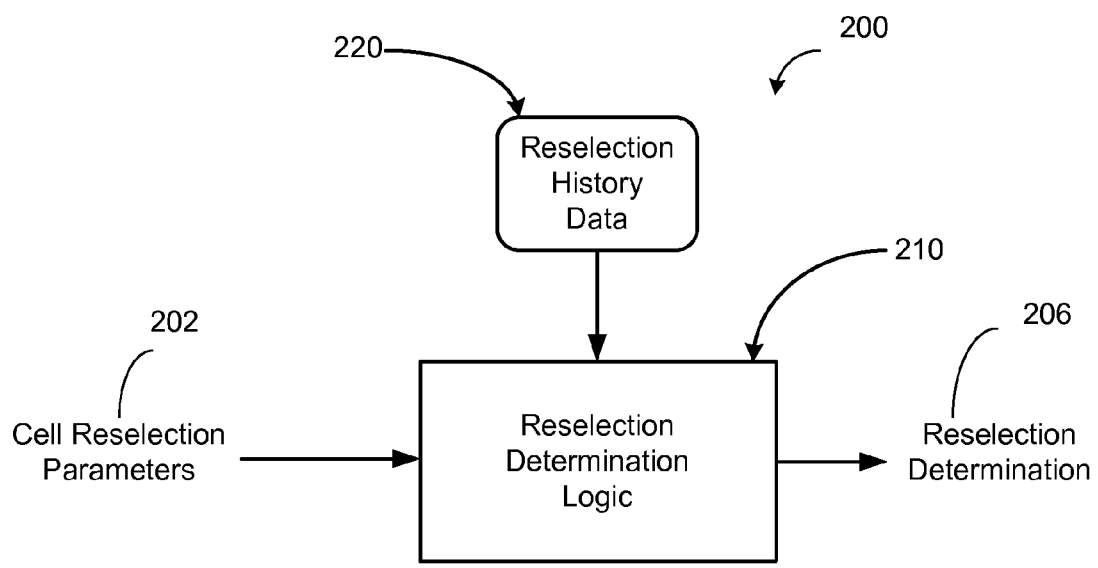
FIG. 2 illustrates an example of a component or system for controlling cell reselections on a computing device, under an embodiment.

FIG. 2 illustrates an example of a component or system for controlling cell reselection attempts on a mobile computing device, under an embodiment. In an embodiment, a reselection determination component 210 operates on, for example, a processor of a radio module in a computing device. In variations, the reselection determination component 210 operates in other components (e.g. CPU) of a computing device. The reselection determination component 220 uses historical data 220 corresponding to recent instances when the device switched cells. The reselection determination component 210 is configured to (i) detect the mobile computing device operating under a potential shuttle reselection condition, and (ii) make a determination as to whether the mobile computing device operation is to be classified as an over-shuttling reselection condition when subsequent cell switching is considered. The reselection determination component 210 makes this determination based on pre-determined criteria.

The reselection determination component 210 uses reselection data 220 as input. The reselection history data 220 can be maintained as, for example, a database or structure that maintains information on occurrences of cell reselections for at least a given duration of time. This information of reselection data 220 includes characteristics of a serving cell and a target cell for each cell reselection made by the mobile computing device, as well as the age of this information. Among other elements, the reselection data 220 may comprise information regarding the frequency, scrambling code, and a location area code for individual serving cells and target cells. In one embodiment, the reselection history data 220 maintains a cell reselection database so that it only stores information for every cell reselection made by the mobile computing device in a given duration (e.g. the last N minutes). In this case, N is a customizable parameter that can be adjusted for storing more or less reselection entries. Because the information includes the age of the cell reselections made by the mobile computing device, cell reselections made by the mobile computing device that are older than N minutes are marked as being invalid.

As described above, the reselection determination component 210 is configured to detect the computing device operating under a potential shuttle reselection condition. In response to detecting the potential shuttle reselection condition, the device can make a determination as to whether the mobile computing device operation, and more specifically, subsequent switching by the device amongst cells, is to be classified as shuttle reselection behavior. The reselection determination component 210 makes this determination based on pre-determined criteria. In one embodiment, the pre-determined criteria include a process, algorithm, or formula that the reselection determination component 210 uses in classifying the device operation as being a shuttle reselection behavior. The reselection determination component 210 uses this formula and the information stored in the cell reselection database to make this determination.

In another embodiment, the pre-determined criteria also include the associated RF conditions of both the current serving cell of a computing device and the target cell of the computing device as well as the cell reselection parameters broadcast by the network 202. In one embodiment, the pre-determined criteria include: (1) a cell selection criterion (S); (2) a cell ranking criterion (R); (3) the power level (RSCP); (4) the signal quality (EC/IO); (5) a hysteresis value (Q); and (6) a cell reselection timer value (T). See standard 3GPP TS 25.304.

Based on the RF conditions, the cell reselection parameters 202 (broadcast), the information found in the cell reselection database, and the pre-determined formula, the reselection determination component 210 can determine if a mobile computing device operation is classified as being an over-shuttling reselection behavior. In one embodiment, certain RF conditions are required for the mobile computing device operation to be classified as operating under shuttle reselection behavior. For example, because an over-shuttling reselection behavior can occur when a mobile computing device is located in a region with multiple overlapping poor or unstable cells, the serving cell and the target cell may both have RF conditions that are poor or unstable. Therefore, in one embodiment, the mobile computing device operation is classified to be operating under the shuttle reselection behavior if: (1) S for the serving cell is greater than 0; (2) the difference in R value between the target cell and the serving cell is less than 10; (3) the RSCP for the target cell is less than −100 dBm; (4) the RSCP for the serving cell is greater or equal to −113 dBm; (5) Q is less than 10; and (6) T is less than 5.

In other embodiments, the computing device operation can be classified to be operating under the shuttle reselection condition under other variations and combinations of the RF conditions.

As discussed above, based on the RF conditions, the information found in the cell reselection database, and the pre-determined formula, the reselection determination component 210 can determine if the mobile computing device operation is classified to be operating under the shuttle reselection condition (i.e., it is ping-ponging between cells of low service quality). In one embodiment, the reselection determination component 210 makes this determination algorithmically. For example, if the mobile computing device operation includes an attempt to perform a reselection from "serving cell 1" to "target cell 2", the reselection determination component 210 can determine the number of cell reselections made by the mobile computing device by looking at its cell reselection data 220. Because the cell reselection data 220 identifies instances of cell reselections made by the mobile computing device for a given period of time, the reselection determination component 210 can determine a number of cell reselections that occurred from or amongst specific cells (e.g. from "serving cell 1" to "target cell 2"). Such an occurrence is a direct match because the mobile computing device operation is attempting to perform a reselection from "serving cell 1" to "target cell 2". Similarly, the reselection determination component 210 can determine the exact number of cell reselections that occurred from "target cell 1" to "serving cell 2". Such an occurrence is a reverse match. The reselection determination component 210 can also determine the number of cell reselections that match only the serving cell, or match only the target cell. Such occurrences are serving cell match only, and target cell match only, respectively.

The reselection determination component 210 may apply a process, algorithm or formula to determine whether the mobile computing device operation is classified as being an over-shuttling reselection behavior. In one embodiment, a formula sums matching entries (as described above, direct match, reverse match, etc.), and divides the sum of matching entries by a total number of valid entries from the cell reselection data 220. The total number of valid entries may correspond to the number of cell reselections made by the mobile computing device for a given time period, represented by the parameter N (as discussed previously). Thus, in an embodiment: SumE (the sum of the matching entries)=DM (total number of direct matches)+RM (the total number of reverse matches)+SCM (the total number of serving cell matches only)+TCM (the total number of target cell matches only)

This sum (SumE) is divided by the total number of valid entries, and if the value is greater than a pre-determined value (e.g., 60%), the mobile computing device operation is classified to be operating under the over-shuttling reselection condition (given that the other RF conditions described above are met). The reselection determination component 210 then outputs a reselection determination 206 so that the mobile computing device can be either prevented from or delayed in switching from the current serving cell to a target cell.

Figure 3A:
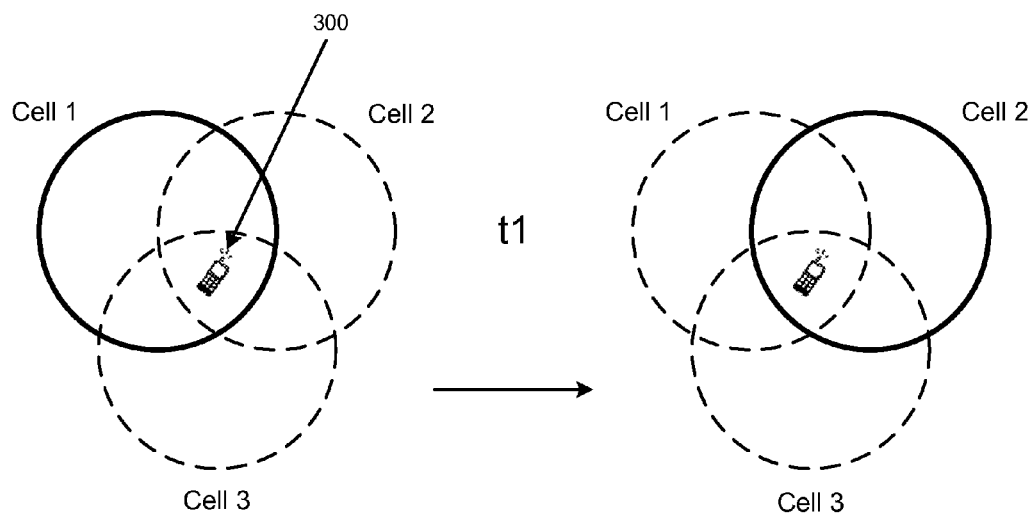
FIG. 3A illustrates an example of a computing device switching from one serving cell to a target cell at time t1.
Figure 3B:
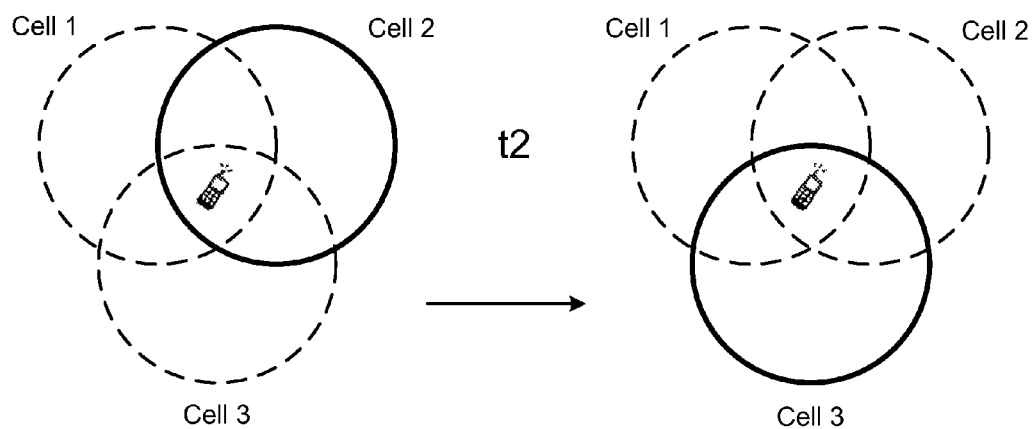
FIG. 3B is another example of the computing device switching from one serving cell to a target cell at time t2.
Figure 3C:
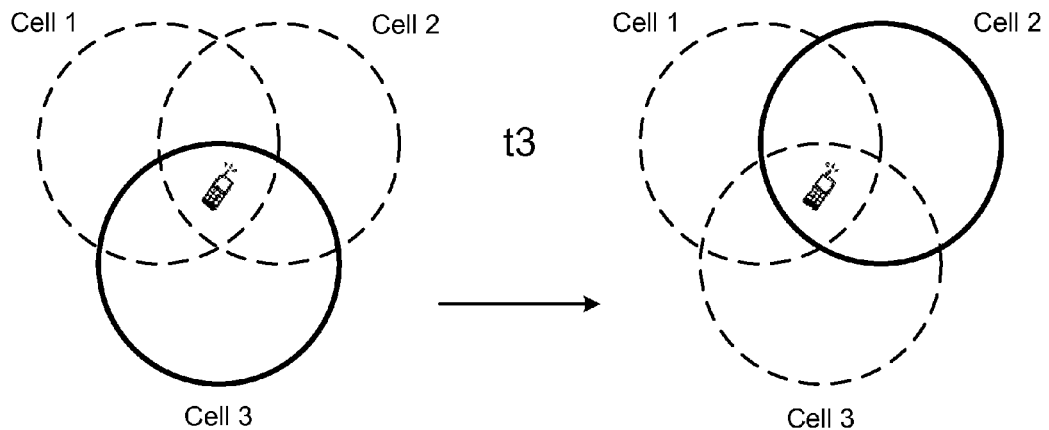
FIG. 3C illustrates another example of the computing device switching from a serving cell to a target cell at time t3.
Figure 3D:
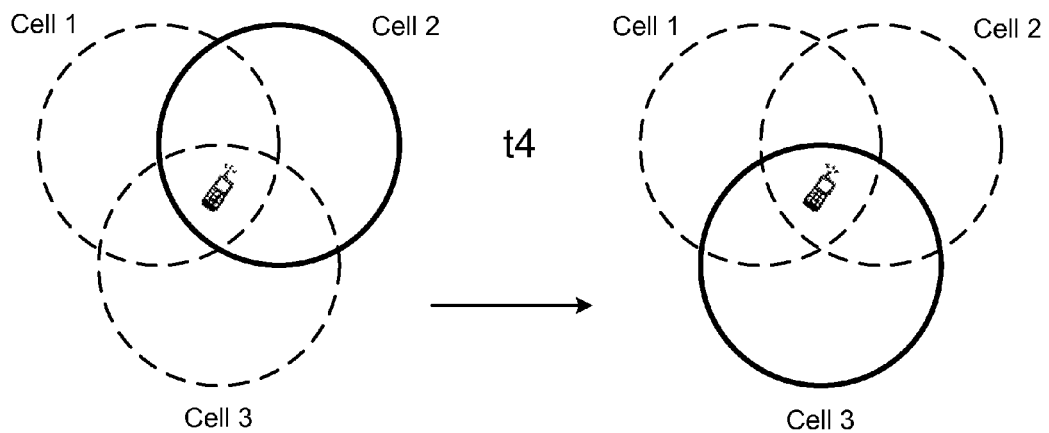
FIG. 3D illustrates yet another example of the computing device switching from one serving cell to a target cell at time t4.

FIGS. 3A-3D illustrate device operations that can be recorded for purpose of determining over-shuttling behavior, in accordance with embodiments described. More specifically, FIG. 3A through FIG. 3D provide an example of a mobile computing device that switches from one cell to another prior to a determination of over-shuttling behavior. The switching is recorded and analyzed (as described) to enable classification of the device behavior, and to preclude unwanted over-shuttling behavior. Each cell reselection is shown as an entry (see entries 352 in table 350 of FIG. 3E). In FIG. 3A, a mobile computing device 300 is shown to be located in a region overlapped by three cells, Cell 1, Cell 2, and Cell 3. At t0, the mobile computing device 300 is connected to a serving cell, Cell 1. At time t1, the mobile computing device 300 performs a reselection and switches to target cell, Cell 2. FIG. 3B illustrates the mobile computing device 300 performing a reselection from the serving cell, Cell 2, to the target cell, Cell 3. At time, t2, the mobile computing device 300 switches cells from Cell 2 to Cell 3. FIG. 3C shows the mobile computing device 300 performing a reselection from Cell 3, its serving cell, to Cell 2, the target cell. The mobile computing device 300 performs the reselection at time t3, so that its serving cell becomes Cell 2. FIG. 3D illustrates a similar scenario where the mobile computing device 300 switches cells from Cell 2 to Cell 3 at time t4.

FIG. 3E is an example of a cell reselection table (or database) with records of cell reselections made by the mobile computing device 300, under an embodiment. The cell reselection table 350 includes entries 352 for each reselection. The entries identify the times, t1 through t4, as well as the serving cells and target cells for each reselection made by the mobile computing device 300. As discussed above, the cell reselection table 350 can maintain the cell reselection records for a given period of time.

In another embodiment, cell reselection table 350 will also include characteristics, such as the frequency, the scrambling code, the location area code, and cell identity for each serving cell and each target cell. Every entry can also be provided with an associated timer which records the time at which the cell reselection occurred. Entries older than a given period of time are marked as being invalid, and are excluded from subsequent determinations on whether over-shuttling behavior is present.

Figure 4:
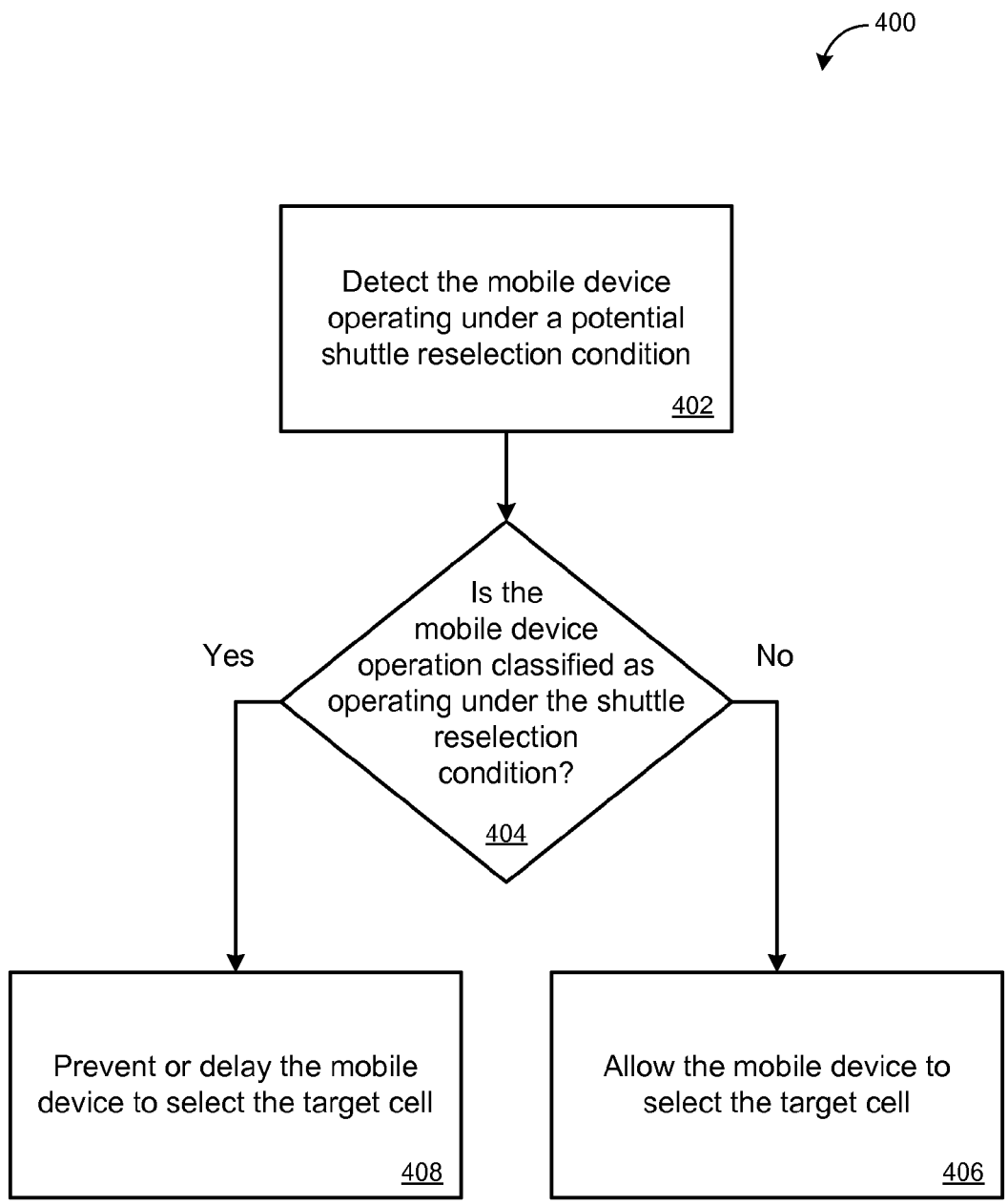
FIG. 4 is a flow chart illustrating a method for controlling cell reselection attempts on a computing device in one embodiment.

FIG. 4 illustrates a method for controlling cell reselection attempts on a computing device, under an embodiment. A method such as described may use or incorporate elements described with other figures, for purpose of performing a step or sub-step being described.

The reselection determination component 210 detects the computing device operating under a potential shuttle reselection condition (402). The computing device operation is an attempt to perform a reselection by switching from a serving cell to a target cell.

The reselection determination component 210 makes a determination as to whether the computing device operation is classified to be operating under the shuttle reselection condition (404). In one embodiment, the reselection determination component 210 makes this determination based on pre-determined criteria. The pre-determined criteria can include RF conditions and cell reselection parameters as well as a mathematical formula. The reselection determination component 210 uses this formula with the information stored in the cell reselection database to determine if the computing device operation is operating under the shuttle reselection condition.

Based on the RF conditions, the cell reselection parameters broadcast by the network, the information found in the cell reselection database, and the pre-determined formula, the reselection determination component 210 can determine if the computing device operation is operating under an over-shuttling reselection condition. If the computing device operation is not classified to be operating under the over-shuttling reselection condition, the computing device is allowed to perform the reselection and switch from the serving cell to a target cell (406). In this scenario, the reselection is allowed because the computing device is attempting to switch to a more stable and better target cell. The computing device operation was not a shuttle reselection condition because it was attempting to switch to a target cell that has a higher power level or a better signal quality than the current serving cell without being evaluated as part of shuttling.

On the other hand, if the computing device operation is classified to be operating under the over-shuttle reselection condition with respect to that target cell, the computing device is precluded or delayed from performing the reselection (408). The computing device is thus prevented or delayed from continuously switching back and forth (i.e., over-shuttling or ping-ponging) from one cell to another, when both cells provide poor power and/or signal conditions.

In one embodiment, the computing device is prevented or delayed from performing the reselection by increasing the timer associated with the reselection conditions to the maximum value allowable. In a normal reselection condition, if the rank of a target cell is better than the rank of a serving cell for T(resel) seconds, then the reselection is configured to succeed. However, when the computing device operation is classified as operating under the shuttle reselection condition, T(resel) is increased so that reselection does not succeed unless the rank of the target cell is better than the rank of the serving cell for a much longer period of time. In one embodiment, because T(resel) can be customizable, T(resel) can be increased to 31 seconds, for example, to prevent or delay the computing device from switching to a target cell when the computing device operation is classified as operating under an over-shuttling reselection condition.

Figure 5:
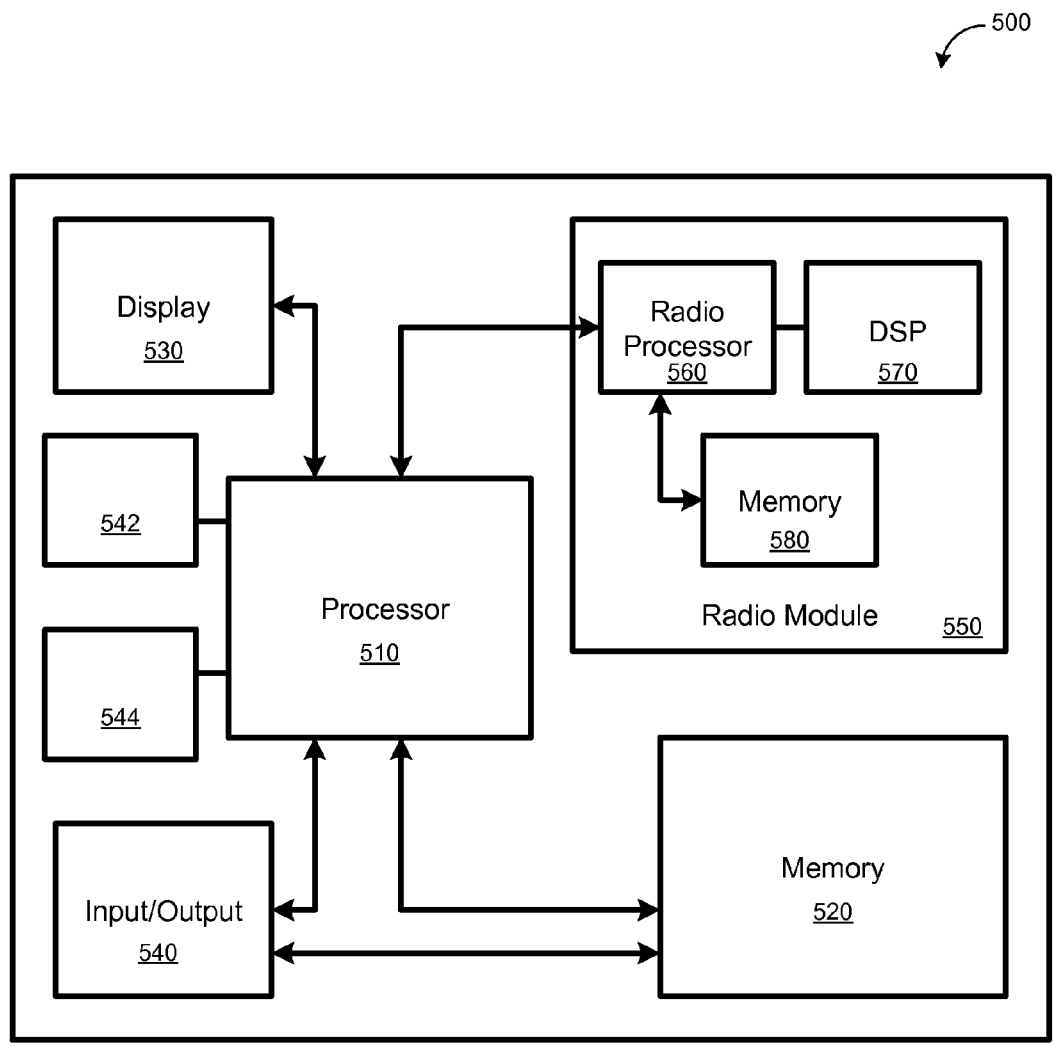
FIG. 5 illustrates a hardware diagram of a computing device for use with one or more embodiments.

FIG. 5 illustrates a hardware diagram of a computing device for use with one or more embodiments. A computing device may correspond to any device that can operate on a cellular network, including mobile computing devices such as cellular-telephony/messaging devices, laptops, or modem modules. In FIG. 5, device 500 includes a processor 510, memory resources 520, display 530, wireless (e.g., Bluetooth, Wireless Fidelity 802.11(b), (g) or (n)) and wireline communication ports 542, 544 and input/output components 540 (buttons, touch-screen input, microphone etc.). The device 500 also includes a radio module 550 for cellular voice and data transmissions.

In one implementation, radio module 550 includes processing and memory resources separate from the main processor/memory of the device. The radio module 550 includes a modem processor 560, a digital signal processor (DSP) 570 and memory resources 580. In numerous embodiments described herein, algorithms and programmatically made determinations or operations can be performed on the radio module 550. In some embodiments, modem processor 560 performs processes or steps described with, for example, FIGS. 1A and 1B, FIG. 2, FIG. 3A through FIG. 3E, and FIG. 4.

Embodiments described herein include individual elements and concepts described herein, independently of other concepts, ideas or systems, as well as combinations of elements recited anywhere in this application. Although illustrative embodiments of the invention have been described in detail with reference to the accompanying drawings, it is to be understood that the described embodiments are not limited to those precise embodiments, but rather include modifications and variations as provided. Furthermore, a particular feature described either individually or as part of an embodiment can be combined with other individually described features, or parts of other embodiments, even if the other features and embodiments make no mention of the particular feature.

What is claimed is:

1. A method for controlling cell reselection in a mobile device, the method being performed by one or more processors of the mobile device and comprising:
    detecting a mobile device operation as operating under a potential over-shuttling reselection condition in which the mobile device is triggered to switch from a serving cell to a target cell based, at least in part, on quality conditions of the serving cell in use by the mobile device;
    responding to detecting the mobile device operation as operating under the potential over-shuttling reselection condition by making a determination as to whether the mobile device operation is classified to be operating under an over-shuttling reselection condition based on pre-determined criteria that considers information about one or more cell reselections made by the mobile device in a given time period, wherein making the determination is further performed by (i) deriving a first value based on a number of cell reselections made by the mobile device that relate to the serving cell or the target cell and a total number of cell reselections made by the mobile device in the given time period, and (ii) comparing the first value to a pre-determined value; and
    preventing or delaying the mobile device from switching from the serving cell to the target cell in response to the determination that the mobile device operation is operating under the over-shuttling reselection condition.

2. The method of claim 1, wherein the information about one or more cell reselections made by the mobile device includes characteristics for each serving cell and each target cell for each of the one or more reselections made by the mobile device.

3. The method of claim 2, wherein the characteristics include at least one or more of: (i) frequency, (ii) scrambling code, (iii) location area code, and (iv) cell identity for each serving cell and each target cell.

4. The method of claim 1, wherein the pre-determined value is customizable.

5. The method of claim 1, wherein preventing the mobile device from switching from the serving cell to the target cell comprises increasing a reselection timer duration associated with the over-shuttling reselection condition so that the mobile device is prevented from switching from the serving cell to the target cell unless a rank of the target cell is higher than a rank of the serving cell for the reselection timer duration.

6. The method of claim 5, wherein the reselection timer duration is increased to a maximum value allowable.

7. The method of claim 1, wherein the pre-determined criteria includes a plurality of radio frequency conditions and cell reselection parameters.

8. The method of claim 7, wherein the plurality of radio frequency conditions comprises at least one or more of: (i) a cell selection criterion, (ii) a cell-ranking criterion, and (iii) a hysteresis value.

9. A mobile device comprising:
    one or more processors configured to:
        detect a mobile device operation as operating under a potential over-shuttling reselection condition in which the mobile device is triggered to switch from a serving cell to a target cell based, at least in part, on quality and/or strength conditions of the serving cell in use by the mobile device;
        respond to detecting the mobile device operation as operating under the potential over-shuttling reselection condition by making a determination as to whether the mobile device operation is classified to be operating under an over-shuttling reselection condition based on a pre-determined criteria that considers information about one or more cell reselections made by the mobile device in a given time period, wherein making the determination is further performed by (i) deriving a first value based on a number of cell reselections made by the mobile device that relate to the serving cell or the target cell and a total number of cell reselections made by the mobile device in the given time period, and (ii) comparing the first value to a pre-determined value; and
        prevent or delay the mobile device from switching from the serving cell to the target cell in response to the determination that the mobile device operation is operating under the over-shuttling reselection condition.

10. The mobile device of claim 9, wherein the information about one or more cell reselections made by the mobile device includes characteristics for each serving cell and each target cell for each of the one or more reselections made by the mobile device.

11. The mobile device of claim 10, wherein the characteristics include at least one or more of: (i) frequency, (ii) scrambling code, (iii) location area code, and (iv) cell identity for each serving cell and each target cell.

12. The mobile device of claim 9, wherein the pre-determined value is customizable.

13. The mobile device of claim 9, wherein preventing the mobile device from switching from the serving cell to the target cell comprises increasing a reselection timer duration associated with over-shuttling reselection condition so that the mobile device is prevented from switching from the serving cell to the target cell unless a rank of the target cell is higher than a rank of the serving cell for the reselection timer duration.

14. The mobile device of claim 13, wherein the reselection timer duration is increased to a maximum value allowable.

15. The mobile device of claim 9, wherein the pre-determined criteria includes a plurality of radio frequency conditions.

16. The mobile device of claim 15, wherein the plurality of radio frequency conditions comprises at least one or more of: (i) a cell selection criterion, (ii) a cell-ranking criterion, and (iii) a hysteresis value.

17. A cellular radio module for a computing device, the cellular radio module including:
one or more processors configured to:
detect a computing device operation as operating under a potential over-shuttling reselection condition in which the computing device is triggered to switch from a serving cell to a target cell based, at least in part, on quality and/or strength conditions of the serving cell in use by the computing device;
respond to detecting the computing device operation as operating under the potential over-shuttling reselection condition by making a determination as to whether the computing device operation is classified to be operating under an over-shuttling reselection condition based on a pre-determined criteria that considers information about one or more cell reselections made by the computing device in a given time period, wherein making the determination is further performed by (i) deriving a first value based on a number of cell reselections made by the computing device that relate to the serving cell or the target cell and a total number of cell reselections made by the computing device in the given time period, and (ii) comparing the first value to a pre-determined value; and
prevent or delay the computing device from switching from the serving cell to the target cell in response to the determination that the computing device operation is operating under the over-shuttling reselection condition.

18. The cellular radio module of claim 17, wherein the information about one or more cell reselections made by the computing device includes characteristics for each serving cell and each target cell for each of the one or more reselections made by the computing device.

19. The cellular radio module of claim 18, wherein the characteristics include at least one or more of: (i) frequency, (ii) scrambling code, (iii) location area code, and (iv) cell identity for each serving cell and each target cell.

20. The cellular radio module of claim 17, wherein the one or more processors prevent the computing device from switching from the serving cell to the target cell by increasing a reselection timer duration associated with the over-shuttling reselection condition so that the computing device is prevented from switching from the serving cell to the target cell unless a rank of the target cell is higher than a rank of the serving cell for the reselection timer duration.

* * * * *